United States Patent [19]
Chiussi et al.

[11] Patent Number: 5,905,711
[45] Date of Patent: *May 18, 1999

[54] METHOD AND APPARATUS FOR CONTROLLING DATA TRANSFER RATES USING MARKING THRESHOLD IN ASYNCHRONOUS TRANSFER MODE NETWORKS

[75] Inventors: Fabio Massimo Chiussi, Tinton Falls; Vijay Pochampalli Kumar, Freehold, both of N.J.; Ye Xia, Richmond, Calif.

[73] Assignee: Lucent Technologies Inc., Murray Hill, N.J.

[*] Notice: This patent is subject to a terminal disclaimer.

[21] Appl. No.: 08/751,045

[22] Filed: Nov. 15, 1996

Related U.S. Application Data

[60] Provisional application No. 60/014,264, Mar. 28, 1996.

[51] Int. Cl.⁶ ............................................ H04J 3/16
[52] U.S. Cl. ........................... 370/232; 370/253; 370/395
[58] Field of Search .................................... 370/230, 231, 370/232, 233, 236, 395, 252, 253

[56] References Cited

U.S. PATENT DOCUMENTS

| | | | |
|---|---|---|---|
| 5,090,011 | 2/1992 | Fukuta et al. | 370/230 |
| 5,400,329 | 3/1995 | Tokura et al. | 370/232 |
| 5,457,687 | 10/1995 | Newman | 370/232 |
| 5,701,292 | 12/1997 | Chiussi et al. | 370/232 |

*Primary Examiner*—Chi H. Pham
*Assistant Examiner*—Maikhanh Tran

[57] ABSTRACT

A method and apparatus for controlling the data transfer rates of data sources in an asynchronous transfer mode-based network utilizing intelligent marking to identify those data sources with a data transfer rate exceeding a marking threshold and to direct those thus-identified data sources to reduce their data transfer rates, and to identify those data sources with a data transfer rate lower than a marking threshold and to direct those thus-identified data sources to increase their data transfer rates when the maximum data transfer rate at a communications switch exceeds a first threshold When the maximum data transfer rate at the communications switch exceeds a second thresholds directing all data sources to reduce their data transfer rates. The first and the second thresholds are based on a congestion indicator of available bit rate traffic stored in a buffer in the communications switch. The marking threshold equals a first function of at least a communications switch maximum data transfer rate multiplied by a second function of at least a first congestion indicator.

28 Claims, 5 Drawing Sheets

METHOD AND APPARATUS FOR CONTROLLING DATA TRANSFER RATES USING MARKING THRESHOLD IN ASYNCHRONOUS TRANSFER MODE NETWORKS

This nonprovisional application claims the benefit of U.S. Provisional Application No 60/014,264 filed Mar. 28, 1996.

BACKGROUND OF THE INVENTION

1. Field of the Invention

The present invention relates to a method and an apparatus for controlling data transfer rates of data sources by guaranteeing that a marking threshold is a good estimate of the fair share of the available bandwidth to which data transfer rates are supposed to converge, in order to provide available bit rate service in asynchronous transfer mode networks.

2. Description of Related Art

A service category, called available bit rate (ABR), has recently been introduced in asynchronous transfer mode (ATM) networks to support applications that cannot be addressed efficiently by existing constant bit rate (CBR), variable bit rate (VBR), and unspecified bit rate (UBR) services. The introduction of ABR services has been motivated by the need for supporting traffic generated by highly-bursty data applications, where data packets are segmented into ATM cells. Most of these applications cannot predict their own traffic parameters, but have well-defined cell loss requirements, in order to avoid throughput collapse due to packet retransmission For these applications, a static allocation of resources at call setup time, as is used in CBR and VBR, would either be wasteful or inadequate. In ABR, only lower and upper bounds on the bandwidth of a connection are specified at call setup, and the ABR service guarantees a cell loss rate only to those connections whose source dynamically adapts its traffic in accordance with feedback received from the network. One issue with this service is to ensure fairness among the connections The definition of the congestion control scheme used to generate feedback information from the network to dynamically regulate the cell generation process of each virtual connection (VC) relies on the use of special control cells called resource management (RM) cells, which are used to convey control information to the end points. Each data source regularly sends forward RM cells every NRM (where NRM is the number of data cells corresponding to the RM cell, e.g. 32) data cells. When the destination receives forward RM cells, it returns the RM cell to the data source as a backward RM cell. The switches in the network can also directly generate backward RM cells to communicate congestion to the source. The RM cell contains data transfer information that instructs the source to either increase or decrease its rate. In particular, RM cells contain a bit called a congestion indication (CI) bit, which is used to have a source increase or decrease its rate by some predefined amount, and a field, called the ER field, to carry a 16-bit floating-point number representing the explicit rate, which is an upper bound on the rate that a connection is allowed to transmit. The RM cells also contain a field, called the current cell rate (CCR) field, which is set by the source to its current allowed cell rate (ACR) when it generates a forward RM cell.

Each switch in the network that receives ATM traffic, controls congestion by implementing at least one of three methods: 1) EFCI marking, where the switch only marks a control bit in the data cells to indicate congestion, and relies on the destinations to convey information back to the sources by properly marking RM cells; 2) relative rate (RR) marking, where the switch uses RM cells to provide binary feedback on its state of congestion to each source; or 3) explicit rate (ER) marking, where the switch uses RM cells to explicitly provide the allowed rate to each source.

Many methods that can be implemented at the switches to control the data rates of the connections have been devised. Such existing methods, however, either do not perform satisfactorily, or have high implementation complexity Thus, a method and apparatus that achieves good performance by guaranteeing fairness and control on the buffer size and is simple to implement is desired.

SUMMARY OF THE INVENTION

It is an object of the present invention to provide a method and an apparatus for controlling the data transfer rate of data sources in an ATM-based network. A communications switch that is part of the network receives electronic code and data from data sources and monitors at least one congestion indicator, or queue length. When the at least one congestion indicator equals or exceeds a first threshold, the communications switch transmits electronic code or a resource management (RH) cell, which includes data transfer rate information, to a first group of data sources, each data source in the first group having a data transfer rate greater than or equal to a communications switch marking threshold. The information included in the RM cell instructs each data source in the first group to reduce its data transfer rate. The communications switch also transmits electronic code or a resource management (RH) cell, which includes data transfer rate information, to a second group of data sources, each data source in the second group having a data transfer rate smaller than a communications switch marking threshold. The information included in the RM cell instructs each data source in the second group to increase its data transfer rate. When the congestion indicator equals or exceeds a second threshold, the communications switch transmits an RM cell to all data sources. The information included in the RM cell instructs the data sources to reduce the data transfer rates .

Other objects, advantages and salient features of the invention will become apparent from the detailed description taken in conjunction with the annexed drawings, which disclose preferred embodiments of the invention.

BRIEF DESCRIPTION OF THE DRAWINGS

The invention is described in relation to the accompanying drawings in which like reference numerals refer to like elements and wherein.

DETAILED DESCRIPTION OF PREFERRED EMBODIMENTS

Figure 1:
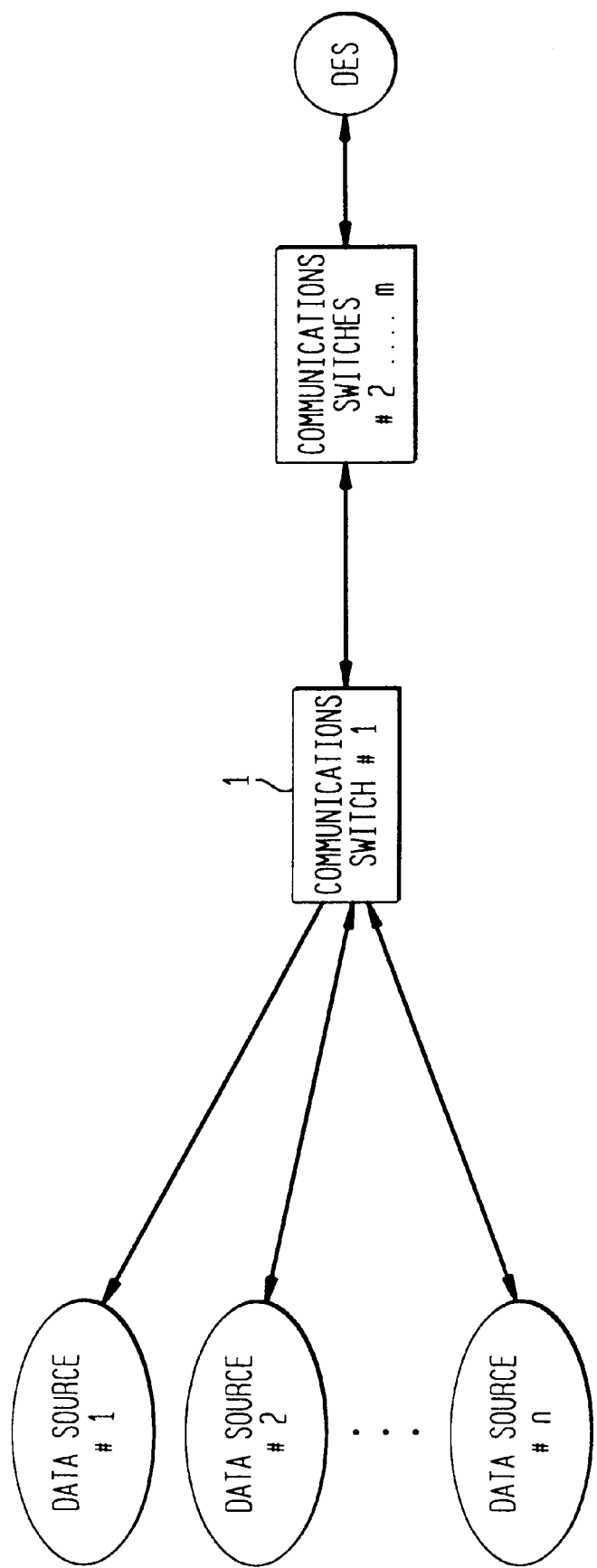
FIG. 1 depicts a number of data sources connected to a switch in an ATM-based network.

FIG. 1 shows a generalized ATM-based network. In this network a number of data sources 1,2 . . . n are connected to a switch lo The switch 1 may in turn be connected to switches 2 . . . m. Eventually data from data sources 1, 2 . . . n are transferred to a destinations DES. Any switch (from 1 to m) in the network may be used to control data transfer rates of the data sources, 1, 2 . . . n connected to switch 1 in order to prevent overload of the network.

To prevent overloads the switch 1 adjusts the data transfer rates of the data sources, 1, 2 . . . n To achieve even load conditions each data source 1, 2 . . . n periodically sends an RM cell to the switch 1 The RM cell reaches its destination, which will return the RM cell to switch 1. Subsequently the switch 1 will return the RM cell to each data source. The contents of the RM cell may be those specified by industry standards such as those promulgated by the ATM forum When the RM cell is sent by the data source 1, 2 . . . n to the switch 1, the RM cell contains data transfer rate information regarding the data transfer or bit rate of the data source. When the RM cell is sent by the switch 1 to a data source 1, 2 . . . n, the RM cell contains data transfer rate information which instructs the data source to decrease its data transfer rate by a specific amount or allows the data source to increase its data transfer rate by a predefined amount, or provides the source with an explicit rate, which is an upper bound of the rate to which the source is allowed to transmit.

Though the above description involves the use of only one switch (switch 1) it should be understood that any number of switches may be involved. For example, when multiple switches are involved an RM cell sent by a data source may travel through each of the switches until it reaches the destination (or intermediate switch). The RM cell then returns to its originating data source. During the path from data source to destination and back to data source, any switch along its path may place data transfer rate information in the RM cell. This allows each switch in the network to control the data transfer rate of all sources which transmit RM cells through such a switch, even if the data sources are physically connected to a different switch.

Figure 2:
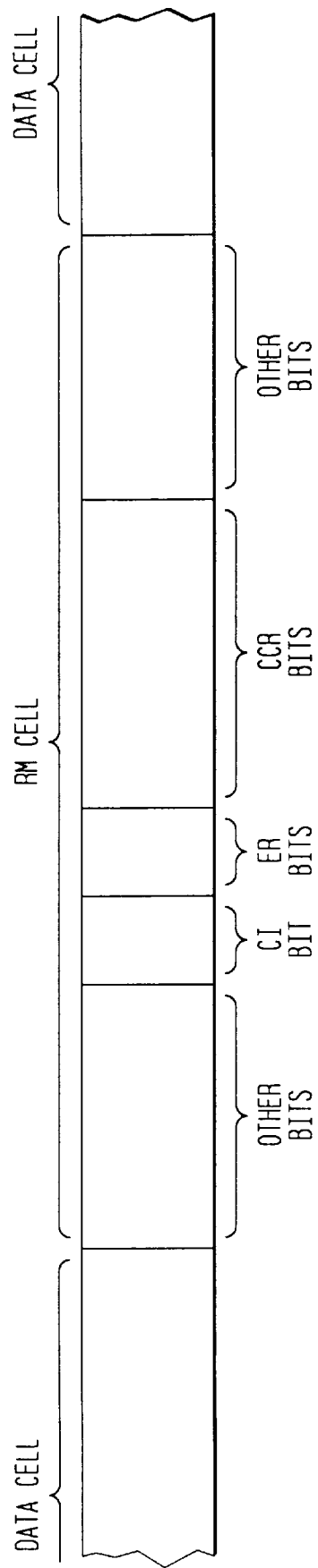
FIG. 2 depicts a generalized RM cell that is transmitted between data sources and switches of an ATM-based network according to one embodiment of the present invention.

Hereafter, therefore, when reference is made to a single switch such as switch 1, it should be understood that any switch in the network, not just the switch which is physically connected to the data sources, may control the data transfer rates of the data sources in the network FIG. 2 shows a generalized RM cell. When the switch 1 sends the RM cell to the data source 1, 2 . . . n, the RM cell may include a congestion indication (CI) bit, an explicit rate (ER) field or bits, and a current cell rate (CCR) field or bits.

In a preferred embodiment of the invention, when the switch 1 detects a congested state within the switch 1, the switch 1 will set the CI bit to a binary 1 or 0. By setting the CI bit to 1 and then transmitting the RM cell to the data source 1, 2 . . . n, the switch 1 instructs the data source to decrease its data transfer rate. By setting the CI bit to 0 and then transmitting the RM cell to a data source 1, 2 . . . n, switch 1 instructs the data source to increase its data transfer rate. The switch 1 may also use an explicit rate (ER) field to set data transfer rates of data sources 1, 2 . . . n.

Figure 3:
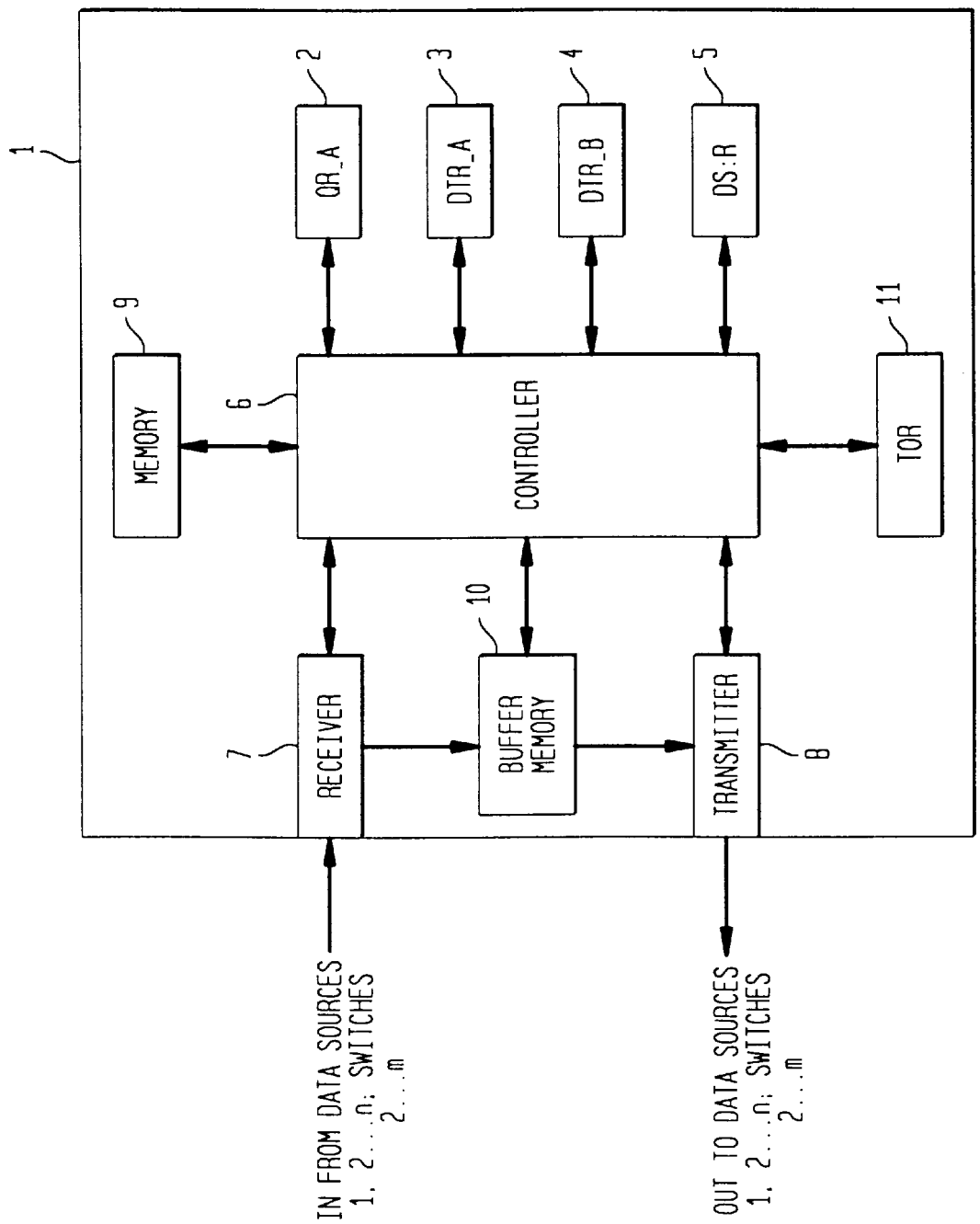
FIG. 3 is a block diagram of an apparatus according to one embodiment for controlling the data transfer rates of data sources in an ATM-based network.

Each data source 1, 2 . . . n of FIG. 1 also transmits an identifier or address to the switch 1 that identifies the data source from every other data source in the network FIG. 3 shows a block diagram of an apparatus or switch 1 according to the present invention As shown, the switch 1 includes at least one queue length register (QR_A) 2 that generates at least one congestion indicator or queue length, at least one first data transfer register (DTR_A) 3 that indicates switch maximum transfer rates, at least one time-out register (TOR) 11 that indicates a maximum period of time, MAX_ TIMEOUT, within which the switch maximum data transfer rates must be updated, at least one second data transfer rate register (DTR_B) 4 that indicates current data transfer rate information and connection identifier of the data source that has sent the most recent RM cell that arrived at switch 1, and a data source identifying register (DSiR) 5 that indicates and identifies at least one data source that has a data transfer rate equal to the switch maximum data transfer rate.

Each of the registers may include a number of registers 1, 2 . . . k. The switch 1 also includes a transmitter 8 for transmitting RM cells and data cells to data sources or to other switches.

The switch 1 contains a memory 9 for storing reference information such as thresholds variables or specific data transfer rates. Included in the switch 1 is a receiver 7 for receiving data including RM cells from all active connections for data sources 1, 2 . . . n as well as from other switches. The switch 1 also contains at least one buffer memory 10 for storing cells awaiting transmission to the next switch or communication link.

A controller 6 contains the algorithm for controlling the rate at which the data sources transmit data. The controller 6 is connected to receiver 7 and notes the values of current data transfer rate and virtual connection (VC) number of each data source 1, 2 . . . n When data cells are received at the switch 1, the controller 6 directs the data cells to be stored in the buffer memory 10. The controller 6 then increments a value of the at least one congestion indicators or queue length, and stores the value in the QR_A 2. Subsequently, when the data cells are transferred from the switch 1, the controller 6 decrements the value of the at least one congestion indicator.

The controller 6 updates a maximum rate (MAX) and a corresponding virtual connection number (MAX_VC) when the RM cell arrives from any data source 1, 2 . . . n with a current cell rate (CCR) greater than an existing value of the MAX stored in the DTR_A 3. The MAX is stored in the DTR_A 3 and the MAX_VC is stored in the DSiR 5. If more than one connection has a CCR equal to the new value of the MAX, the controller 6 records at least one of them in the corresponding MAX VC in the DSiR 5. The value of MAX is also updated every time an RM cell arrives from the data source corresponding to the connection currently identified by MAX_VC. One possible embodiment of an apparatus that updates the MAX is a controller that makes the value of the MAX equal to the content of the CCR field in the RM cell.

To smooth excess oscillations in the MAX; the controller 6 computes an adjusted maximum rate (A_MAX) using a running exponential weighted average with an averaging factor ALPHA, and stores the A_MAX in the memory 9. To make sure that information recorded in the MAX reflects the current status of each of the data sources 1, 2 . . . n, the controller 6 requires that the MAX be updated within a given time interval specified by the value stored in the TOR 11; otherwise MAX is reset to 0.0. This is useful for example, with bursty sources, to avoid that the MAX reflects the CCR of a data source that has become idle.

The controller 6 also computes a marking threshold (MT) that is used to perform intelligent marking of the data source 1, 2 . . . n. The marking threshold equals a first function of at least a communications switch maximum data transfer rate times a second function of the at least one congestion indicator or queue length, where the first function of at least the communications switch maximum data transfer rate may be the adjusted maximum rate A_MAX, and the second function of the at least one congestion indicator or queue length may be a discreet, non-increasing function of the queue length, $0^2 \text{ Fn}^2 1$.

When the at least one congestion indicator equals or exceeds a first threshold, QT, the controller 6 controls that the information contained in the RM cells that the transmitter 8 sends to those of the data sources 1, 2 . . . n whose data transfer rate is greater or equal than the marking threshold instructs those sources to reduce their data transfer rate, and that the information contained in the RM cells that the transmitter 8 sends to those of the data sources 1, 2 . . . n whose data transfer rate is lower than the marking threshold instructs those sources to increase their data transfer rate. The controller 6 may also control that the RM cells transmitted by transmitter 8 to the data sources 1, 2 . . . n have the explicit rate field set equal to the marking threshold.

If the at least one congestion indicator equals or exceeds the second threshold, DQT, then the controller 6 controls that the RM cells that the transmitter 8 sends to each of the data sources 1, 2 . . . n in the network instructs all data sources to reduce their data transfer rates. The controller 6 may also control that the RM cells transmitted by transmitter 8 to the data sources 1, 2 . . . n have the explicit rate field set equal to the marking threshold times an at least first variable MRF, where MRF is a major reduction factor; the at least one first variable MRF may have a value lower than 1.

In the event the controller 6 determines the at least one congestion indicator is less than the first threshold, it controls that the RM cells that the transmitter 8 sends to each of the data sources 1, 2 . . . n in the network instructs those sources that they are allowed to increase their rate of data transfer.

Figure 4A:
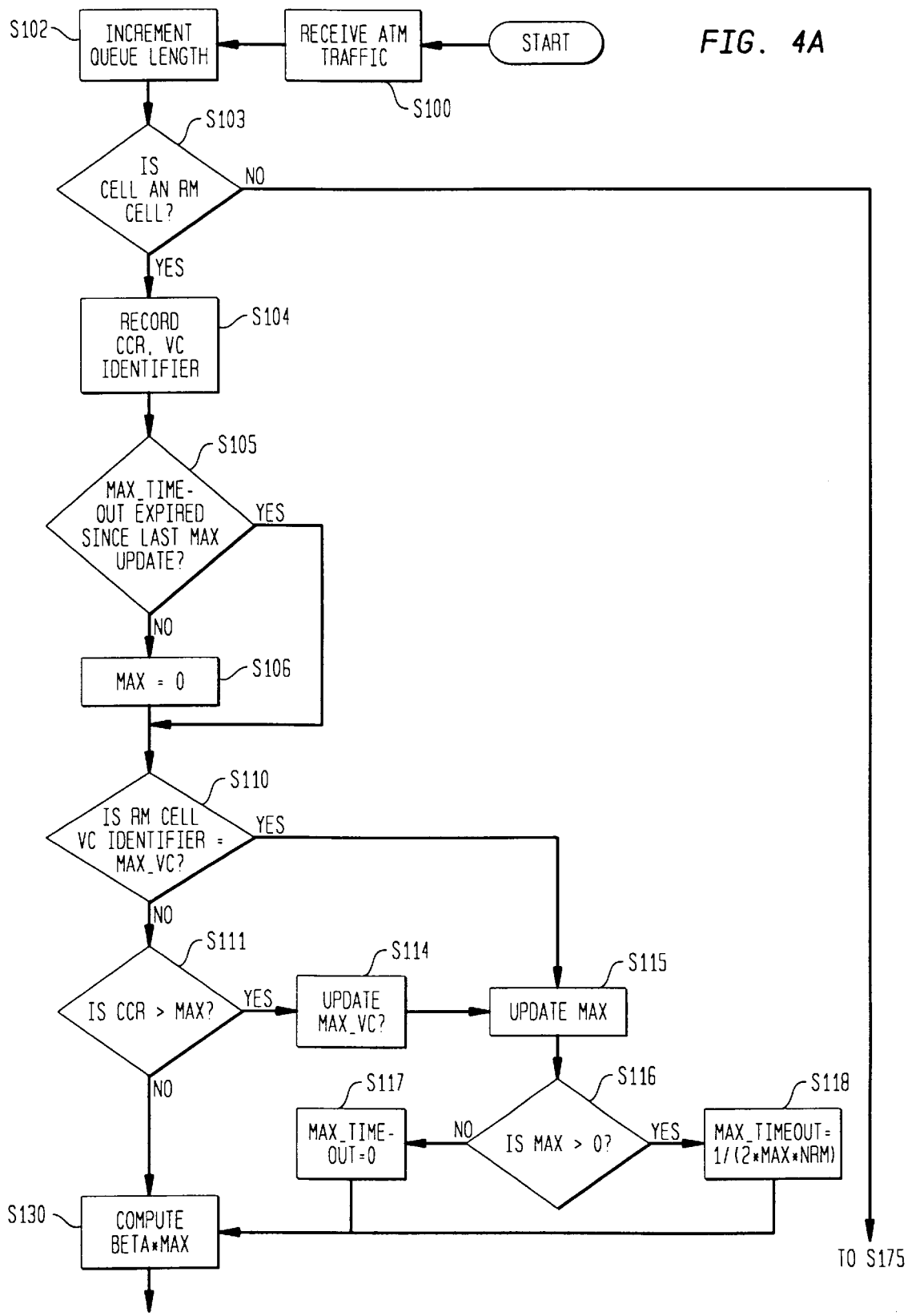
FIGS. 4A and 4B are a flowchart of one method for controlling the data transfer rates of data sources in an ATM-based network.
Figure 4B:
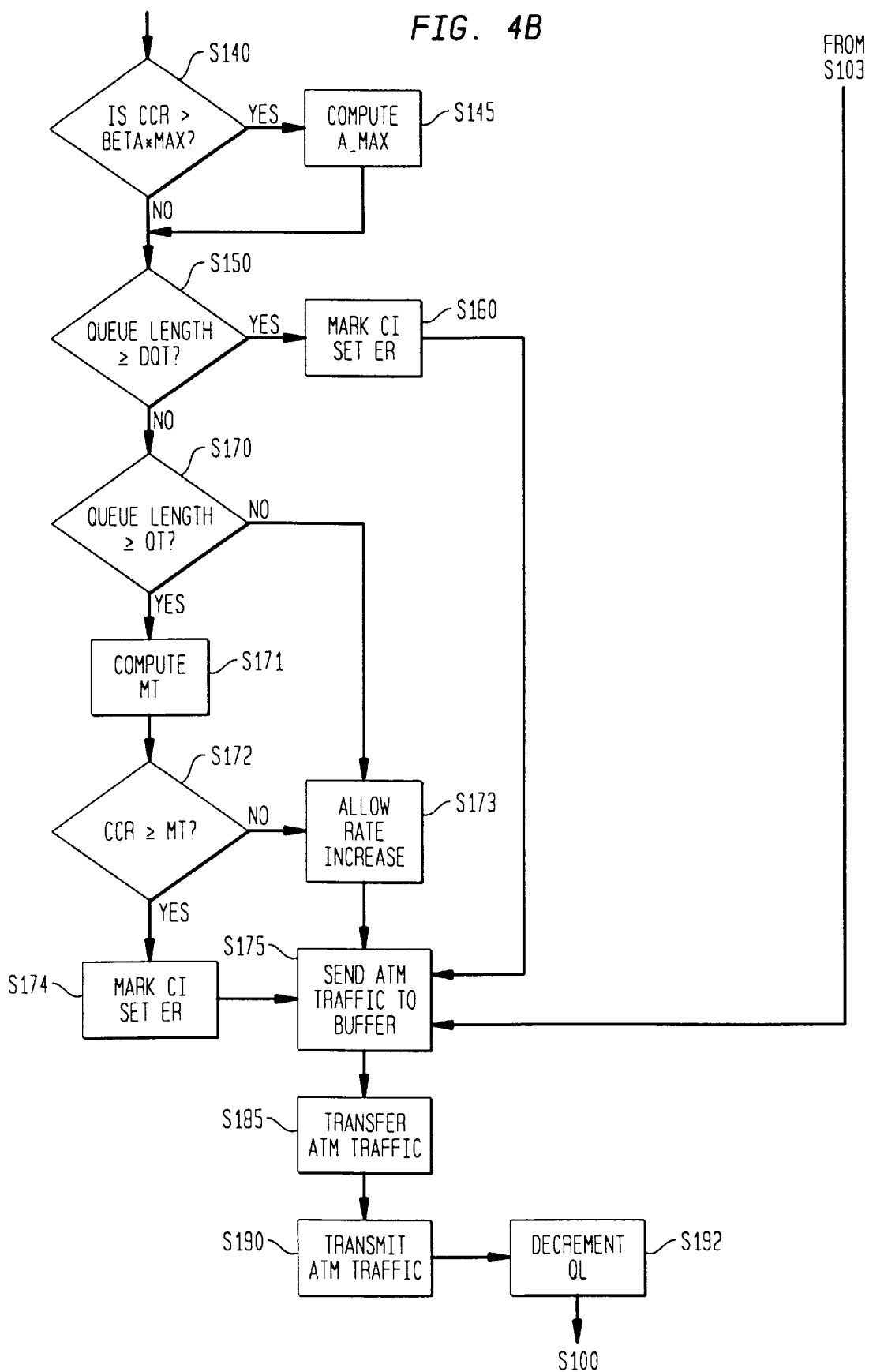

The operation of the switch 1 using the DMRCA algorithm will now be explained by reference to FIGS. 4A and 4B. In step S100, the receiver 7 in the switch 1 receives RM cells and data cells from all data sources 1, 2 . . . n. The switch 1 proceeds to step S102. In step S102, the controller 6 notes the arrival of the RM cells or data cells, increments at least one congestion indicator or queue length, and stores the queue length in QR_A 2. The switch 1 then proceeds to step S103. In step S103, if the arriving cell is an RM cell, the switch 1 then proceeds to step S104. Otherwise, the switch 1 proceeds to step S175. In step S104, the controller 6 notes the value of the data transfer rate, or CCR, and the data source (VC) identifier for the data source that has sent the RM cell and stores the CCR value and the corresponding data source (VC) identifier in the DTR_B 40 The switch 1 then proceeds to step S105.

In step S105, the controller 6 checks that the switch maximum data transfer rate has been updated within an interval specified by MAX_TIMEOUT stored in the TOR 11. If the MAX has been updated within an interval MAX_TIMEOUT, the switch 1 proceeds to step S110. Otherwise, the switch proceeds to step S106. In step S106, the controller 6 resets the value of MAX stored in the DTR_A 3 to 0.

In step S110, the controller 6 compares the data source (VC) identifier of the RM cell stored in the DTR_B 4 with the data source identifying register DSiR 5 which identifies at least one data source MAX_VC that has data transfer rate equal to the switch maximum data transfer rate. If the VC number of the RM cell stored in the DTR_B 4 is equal to MAX_VC, the switch 1 proceeds to step S115. Otherwise the switch 1 proceeds to step S112. In step S112, the controller 6 compares the CCR of the RM cell stored in the DTR_B 4 to the current value of MAX maintained in the DTR_A 3. If the CCR in the DTR_B 4 is greater than MAX, the switch 1 proceeds to step S114. Otherwise, the switch 1 proceeds to step S130.

In step S114, the controller 6 updates the value of MAX_VC making it equal to the data source identifier of the data source that has sent the RM cell, and stores the value of MAX_VC in the DSiR 5. The switch 1 then proceeds to step S115

In step S115, the controller 6 updates the value of the MAX making it equal to the CCR of the RM cell stored in the DTR_B 4 and stores the value of MAX_VC in the DTR_A 3. The switch 1 then proceeds to step S116. In step S116, if the value of MAX is greater than 0, the switch 1 proceeds to step S118. Otherwise the switch 1 proceeds to step S117. In step S117, the value of MAX_TIMEOUT stored in the TOR 11 is updated by making it equal to 0. The switch 1 then proceeds to step S130. In step S118, the value of MAX_TIMEOUT stored in the TOR 11 is updated by making it equal to 1 divided by 2 times MAX times NRM of the data source identified by MAX_VC. The switch 1 then proceeds to step S130.

In step S130, the controller 6 computes BETA*MAX, where BETA is a second variable of value lower than or equal to 1, and greater than 0, and stores the value in the memory 9. The switch 1 then proceeds to step S140.

In step S140, the controller 6 compares the CCR of the RM cell stored in DTR_B 4 to BETA*MAX. If the CCR is greater than or equal to BETA*MAX, the switch 1 proceeds to step 145. Otherwise, the switch 1 proceeds to step 150.

In step S145, the controller 6 computes the adjusted maximum rate, A_MAX, using an exponential running average with averaging factor ALPHA, where ALPHA is a third variable of value lower than or equal to 1. The switch 1 then proceeds to step S150.

In step S150, the controller 6 monitors at least one congestion indicator or queue length stored in the queue length register (QR_A) 2. If in step S150 the at least one congestion indicator equals or exceeds the second threshold, DQT, the switch 1 proceeds to step S160. Otherwise, the switch 1 proceeds to step S170.

In step S160 with the at least one congestion indicator in the QR_A 2 equaling or exceeding a second threshold, DQT, the controller 6 marks the congestion indicator (CI) bit in the RM cell making it equal to 1, and sets the ER field in the RM cell making it equal to A_XX times MRF, where MRF is a major reduction factors Once the RM cell is transmitted and reaches its corresponding data source, the RM cell will instruct such data source to reduce its data transfer rate to a value lower or equal than A_AX times MRF. The switch 1 then proceeds to step S175.

In step S170, the controller 6 compares the at least one congestion indicator or queue length to the first threshold value QT. If the congestion indicator is greater than or equal to QT, the switch 1 proceeds to step S171. Otherwise the switch 1 proceeds to step S173.

In step 171, the switch 1 computes the marking threshold MT making it equal to A_MAX times a function of at least one congestion indicator or queue length and stores MT in the memory 9. The switch 1 then proceed to step S172.

In step S172, the switch 1 compares the CCR of the RM cell stored in the DTR_3 4 to the marking threshold MT stored in the memory 9. In step S172, if the CCR of the RM cell is greater than or equal to the MT, the switch 1 proceeds to step S174. Otherwise, the switch 1 proceeds to step S173.

In step S173 the switch 1 allows the data transfer rate of the data source that has sent the RM cell to increase. This is accomplished by making the CI bit in the RM cell equal to 0. When such RM cell is transmitted to the data source, it will instruct such data source to increase its data transfer rates In step S174, with the at least one congestion indicator greater than the first threshold, QT, the controller 6 marks the CI bit in the RM cell, making it equal to 1. The controller 6 may also set the ER field in the RM cell equal to A__AX. Once the RM cell is transmitted to the data source and reaches such data source, it will instruct such data source to reduce its data transfer rate. The switch 1 then proceeds to step S175.

In step S175, the controller 6 sends the ATM traffic (RM cells or data cells) to the buffer memory 10. The switch 1 then proceeds to step S185. In step S185, the controller 6 transfers an amount of the ATM traffic (RM cells or data cells) from the buffer memory 10 to the transmitter 8 and the switch 1 then proceeds to step S190. In step S190, the transmitter 8 transmits the ATM traffic. Data cells are transmitted to their destination or to other switches, and RM cells are transmitted to their source, to the destinations, or to other switches. The switch 1 then proceeds to step S192.

In step S192, the controller 6 decrements the at least one congestion indicator or queue length based on the amount of the ATM traffic transmitted in step S190 and stores the updated value of the at least one congestion indicator in the QR__A 2. The switch 1 then returns to step S100.

The above described embodiment is but one example of the method and apparatus that may be used to control congestion in an ATH-based network. Modifications to the above-described embodiment may occur to those skilled in the art without departing from the spirit and scope of the present invention as defined in the appended claims.

What is claimed is:

1. A method for controlling data transfer rates of data sources in an asynchronous transfer mode-based network having at least one communications switch, the method comprising:

receiving electronic code from the data sources, the electronic code comprising data transfer rate information;

monitoring at least one first congestion indicator in the communications switch;

transmitting electronic code comprising data transfer rate information from at least the communications switch to a first group of data sources, each one of the data sources in the first group of data sources having a data transfer rate greater than or equal to a communications switch marking threshold, the communications switch marking threshold being equal to a first function of at least a communications switch maximum data transfer rate multiplied by a second function of at least the first congestion indicator, when the at least one first congestion indicator equals or exceeds a first threshold;

transmitting electronic code comprising data transfer rate information from at least the communications switch to a second group of data sources, each one of the data sources in the second group of data sources having a data transfer rate lower than the communications switch marking threshold, when the at least one first congestion indicator equals or exceeds a first threshold, wherein the data transfer rate information transmitted to the first group of data sources is used by each one of the data sources in the first group of data sources to reduce its data transfer rate, the data transfer rate information transmitted to the second group of data sources is used by each one of the data sources in the second group of data sources to increase its data transfer rate;

transmitting electronic code from the communications switch to all the data sources when the at least one first congestion indicator equals or exceeds a second threshold, wherein the data transfer rate information transmitted to all of the data sources when the at least one first congestion indicator equals or exceeds a second threshold is used by each data source to reduce its data transfer rate; and transmitting electronic code from the communications switch to all the data sources when the at least one first congestion indicator is lower than the first thresholds wherein the data transfer rate information transmitted to all of the data sources when the at least one first congestion indicator is lower than the first threshold and is used by each data source to increase its data transfer rate.

2. The method of claim 1, wherein the at least one communications switch maximum data transfer rate and at least one data source identifier are updated after the communications switch receives electronic code comprising data transfer rate information from at least one data source, the at least one data source identifier identifying at least one data source having a data transfer rate equal to the switch maximum data transfer rate.

3. The method of claim 1, wherein the at least one communications switch maximum data transfer rate and at least one data source identifier are updated after the communications switch fails to receive the electronic code from at least one data source, the at least one data source identifier identifying at least one data source having a data transfer rate equal to the communications switch maximum data transfer rate.

4. The method of claim 1, wherein updating the communications switch maximum data transfer rate and the at least one data source identifier is not dependent upon the electronic code received from the at least one data source.

5. The method of claim 1, where the first function used to compute the communications switch marking threshold is a linear function of at least the communications switch maximum data transfer rate.

6. The method of claim 1, where the first function used to compute the communications switch marking threshold is a running exponential weighted average of at least the communications switch maximum data transfer rate and the data transfer rate information received in the electronic code.

7. The method of claim 1, wherein the first function used to compute the communications switch marking threshold is computed when the data transfer rate in the electronic code of at least one of the data sources equals the communications switch maximum transfer rate multiplied by a first variable.

8. The method of claim 7, wherein the first variable is a fraction of the number one.

9. The method of claim 7, wherein the first variable equals one.

10. The method of claim 1, wherein the second function used to compute the communications switch marking threshold is a linear function of at least the first congestion indicator.

11. The method of claim 1, wherein the second function used to compute the communications switch marking threshold is a non-linear function of at least the first congestion indicator.

12. The method of claim 1, wherein the second function used to compute the communications switch marking threshold is a function of the total buffer memory available in the communications switch.

13. The method of claim 1, wherein more than one congestion indicator is monitored and compared to the first and second thresholds.

14. The method of claim 1, further comprising updating at least one congestion indicator in the communications switch as the communications switch receives and transmits the electronic code.

15. The method of claim 1, further comprising updating at least one congestion indicator in the communications switch as the communications switch receives data from at least the data source and transmits the data to one of at least one other communications switch and a destination.

16. The method of claim 1, wherein the at least one first congestion indicator is the queue length.

17. The method of claim 1, where the at least one first congestion indicator is a function of at least one queue length in the communications switch.

18. The method of claim 1, wherein the first congestion indicator is a function of the total available buffer memory in the communications switch.

19. The method of claim 1, wherein the second function used to compute the communications switch marking threshold is a function of a second congestion indicator.

20. The method of claim 19, wherein the second congestion indicator is a function of the amount of data traffic and electronic code received in a specified interval.

21. The method of claim 20, wherein the specified interval is continuously updated.

22. An apparatus for controlling data transfer rates of data sources in an asynchronous transfer mode-based network having at least one communications switch, the apparatus comprising:

a congestion indicator register that generates at least one first congestion indicator;

a first data transfer rate register that indicates a switch maximum switch data transfer rate;

a second data transfer rate register that indicates data transfer rate information from at least one data source;

a data source identifying register that provides a data source identifier that indicates at least one data source having a data transfer rate equal to the switch maximum data transfer rate;

a time-out register that indicates a time-out, the time-out being a maximum period of time within which the switch maximum data transfer rate must be updated;

a transmitter for transmitting electronic code comprising data transfer rate information to the data sources; and a controller for monitoring the at least one first congestion indicator, the switch maximum data transfer rates, the time-out, and the data source identifier, the controller updating the switch maximum data transfer rate, time-out and data source identifier, and controlling the transmitter to transmit the electronic code to a first group of data sources, each of the data sources in the first group of data sources having a data transfer rate at least equal to a communications switch marking threshold, the marking threshold being equal to a first function of at least a communications switch maximum data transfer rate multiplied by a second function of at least the first congestion indicator, when the at least one first congestion indicator equals or exceeds a first threshold, the controller controlling the transmitter to transmit the electronic code to a second group of data sources, each of the data sources in the second group of data sources having a data transfer rate lower than a communications switch marking threshold, the communications switch marking threshold being equal to a first function of at least the communications switch maximum data transfer rate multiplied by a second function of at least the first congestion indicator, when the at least one first congestion indicator equals or exceeds the first threshold, the controller controlling the transmitter to transmit electronic code to all the data sources when the first congestion indicator equals or exceeds a second threshold, and the controller controlling the transmitter to transmit electronic code to all the data sources when the first congestion indicator is lower than the first threshold, wherein the data transfer rate information transmitted to the first group of data sources when the first congestion indicator equals or exceeds the first threshold is used by each one of the data sources in the first group of data sources to reduce its data transfer rate, the data transfer rate information transmitted to the second group of data sources when the first congestion indicator equals or exceeds the first threshold is used by each one of the data sources in the second group of data sources to increase its data transfer rate, wherein the data transfer rate information transmitted to all data sources when the first congestion indicator equals or exceeds the second threshold is used to reduce the data transfer rates of all the data sources, and wherein the data transfer rate information transmitted to all data sources when the first congestion indicator is lower than the first threshold is used to increase the data transfer rates of all the data sources.

23. The apparatus of claim 22, further comprising means for monitoring a total buffer memory available in the communications switch.

24. The apparatus of claim 22, further comprising means for monitoring an amount of data traffic and electronic code received in a specified interval.

25. The apparatus of claim 22, further comprising a receiver for receiving the electronic code from at least one data sources the controller updating the switch maximum data transfer rate and the data source identifier after the receiver receives the electronic code from the at least one data source.

26. The apparatus of claim 22, further comprising more than one congestion indicator registers each congestion indicator register generating at least one congestion indicators wherein more than one congestion indicator is compared to the first and the second thresholds.

27. The apparatus of claim 22, further comprising means for updating at least one congestion indicator in the communications switch as the communications switch receives and transmits the electronic code.

28. The apparatus of claim 22, further comprising means for updating at least one congestion indicator in the communications switch as the communications switch receives data from at least the data sources and transmits the data to one of at least one other communications switch and a destination.

* * * * *